United States Patent [19]

Lay

[11] 4,124,511
[45] Nov. 7, 1978

[54] FLUID FILTER APPARATUS OF STANDARDIZED PIPE DIMENSION HAVING INTERCHANGEABLE FILTER MEANS POSITIVELY SECURED THEREIN

[75] Inventor: Joe B. Lay, Houston, Tex.

[73] Assignee: Fabricated Services, Inc., Houston, Tex.

[21] Appl. No.: 799,191

[22] Filed: May 23, 1977

[51] Int. Cl.² .................................................. B01D 35/02
[52] U.S. Cl. ..................................... 210/447; 210/454
[58] Field of Search ............... 210/232, 445, 447, 450, 210/451, 453, 454, 497 A, 497.1

[56] References Cited

U.S. PATENT DOCUMENTS

| | | | |
|---|---|---|---|
| 1,115,784 | 11/1914 | Cranwell et al. | 210/453 |
| 2,017,350 | 10/1935 | Morgan | 210/232 X |
| 3,561,605 | 2/1971 | Likness | 210/497.1 |
| 3,735,874 | 5/1973 | Steinman | 210/451 X |
| 4,009,109 | 2/1977 | Tullier et al. | 210/447 |
| 4,051,042 | 9/1977 | Tullier et al. | 210/447 X |

OTHER PUBLICATIONS

Strainers for Oil, Water and Steam, Bulletin 9S, Nov. 1954, Schutte and Koerting Co., Cornwells Heights, Bucks County, Pa., p. 15.

*Primary Examiner*—William A. Cuchlinski, Jr.

[57] ABSTRACT

A high capacity low pressure drop flow line filter apparatus of standardized pipe dimension having an interchangeable filter apparatus disposed therein. The filter apparatus is provided with means for positively securing within the apparatus while compensating for dimensional variations in the filter apparatus to provide for such interchangeable use.

2 Claims, 4 Drawing Figures

FLUID FILTER APPARATUS OF STANDARDIZED PIPE DIMENSION HAVING INTERCHANGEABLE FILTER MEANS POSITIVELY SECURED THEREIN

BACKGROUND OF THE INVENTION

This invention relates to the field of fluid filters and in particular to new and improved flow line filters.

The placing of fluid filters in flow line fittings is known. Early examples are disclosed in U.S. Pat. Nos. 249,172; 292,912; 417,399; 295,926; 1,063,467; and 2,779,478. These filters were improved by providing access to the filter element for enabling replacement without the need to remove the filter housing from the flow path. For examples, see U.S. Pat. Nos. 1,152,831; 1,682,655; 1,917,203; and 2,545,789.

A limiting factor in the use of flow line filters as strainers has been the fluid pressure drop and inherently related flow rate through such filters. Some attempts to overcome that problem include U.S. Pat. Nos. 398,735; 664,280; 852,584; 1,213,140; 2,011,031; 2,028,520; 2,260,874; 2,369,740; 2,820,702; and 3,481,474. In general, these prior art solutions employed an enlarged flow housing having inlet and outlet openings that did not conform to the standardized dimension of pipe fitting as established by the American Standards Association (ASA) and now universally accepted. Another solution such as disclosed in U.S. Pat. No. 983,352 and 2,979,209, has been to reinforce the filter screen to withstand the greater differential pressure resulting from high capacity flow.

Removing the filtered sediment from the flow housing has also presented some problems. One means for overcoming such problem is disclosed in U.S. Pat. No. 2,372,445, while U.S. Pat. Nos. 555,685 and 1,704,634 represent earlier attempts to overcome that same problem. Self-cleaning filter screens, such as disclosed in U.S. Pat. No. 3,487,931, have also been employed. Backwash means, such as disclosed in U.S. Pat. Nos. 3,387,712; 3,828,930 and mechanical means, such as disclosed in U.S. Pat. No. 2,022,017, have also been employed to prevent clogging of the filter and attendant increases in pressure drop and decreases in flow capacity.

Often inline flow filters were combined in a standard dimension flow housing with a valve which further reduced the filter flow capacity. Examples of such filters are disclosed in U.S. Pat. Nos. 2,017,350 and 3,735,874.

An improved flow line filter having fine screening capability coupled with high capacity has been commercially available from the assignee of the present invention under the trademark "CORE-T." In general, these fluid filters provide a filter housing having standard pipe dimensions and employed a self-cleaning filter screen employing a helically wedge wire filter element that provides means for back-flushing. Such filter elements are generally of the type disclosed in U.S. Pat. Nos. 3,561,605; 3,584,685; and 3,667,615. Such filters have been custom fabricated rather than mass produced as the filter screens were not interchangeable between filter housings due to variations in filter length. Both straight through and 90° elbow designs have been custom manufactured.

U.S. Pat. No. 3,011,644 to Farrell, et al. discloses a flow line filter screen in which the filter screen is easily accessible to enable rapid changing. The interchangeable filter screen is held in position by a bow spring in both disclosed embodiments. In the straight through flow embodiment, the lug 35 serves to limit longitudinal movement of the screen, but the build up of a sufficient pressure differential across the screen will result in overcoming the urging of the bow spring and tilting of the filter element which breaks the seal and effectively by-passes the fluid about the filter element. In the 90° elbow embodiment, the pressure differential also will overcome the urging of bow spring 69 to break the seal and enable the undesired by-pass flow.

U.S. Pat. No. 1,223,299 discloses a filter that is positively held against inadvertent by-pass leakage due to pressure build up across the filter, but the filter screen extended beyond the standard dimension between the inlet and outlet of a pipe fitting. Such an arrangement is also disclosed in U.S. Pat. No. 2,507,591.

SUMMARY OF THE INVENTION

A new and improved flow line fluid filter apparatus.

The flow line filter housing is formed of pipe fittings providing a flow path with inlet and outlet openings conforming to ASA standardized dimension. Disposed within the flow path formed by the filter housing is a tubular filter screen means which sealingly engages the pipe fitting at one end to direct the flow through the filter screen. The housing is provided with an access opening for permitting changing of the filter screen apparatus when desired and which is closed by a removable closure means during filtering. Means are provided in the filter screen for positively securing the interchangeable filter screen in sealing engagement with the housing by compensating for the different dimensional tolerances of the various filter screens.

An object of the present invention is to provide a new and improved flow line fluid filter apparatus having interchangeable filter screens.

DESCRIPTION OF THE PREFERRED EMBODIMENT

Figure 3:
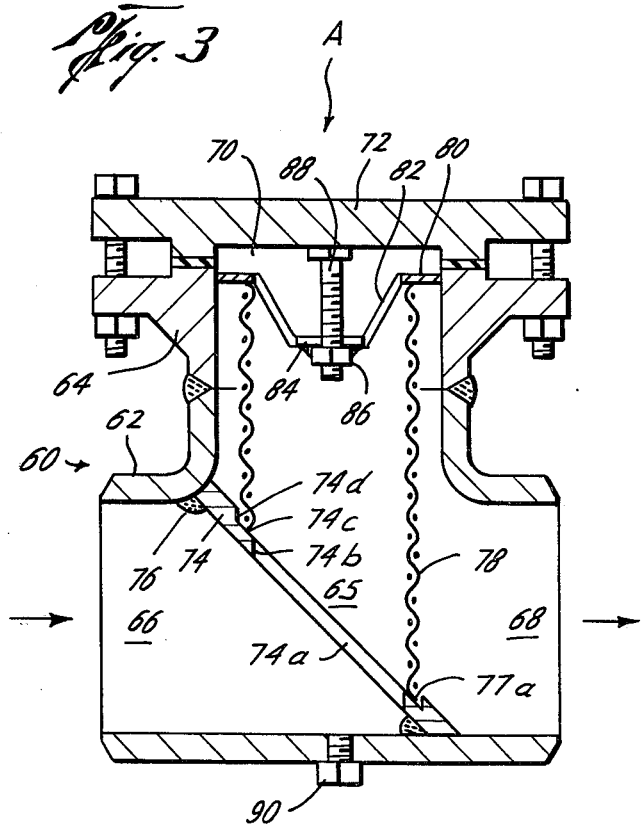
FIG. 3 is a view similar to FIG. 1 illustrating a second embodiment of the present invention.

In the FIGS. the flow line fluid filter apparatus of the present invention is generally designated A. The first embodiment illustrated in FIG. 1 forms a right angle flow line elbow while the second embodiment, illustrated in FIG. 3, provides a straight flow line fitting for the fluid to be filtered. The embodiment illustrated in FIG. 3 is equally well suited for installation in horizontal or vertical flow pipe runs, but the flow should always be in the direction indicated by the flow arrows. The flow direction through the embodiment of FIG. 1 may be reversed from that indicated by the flow arrows, but certain modifications may be desirable when the flow direction is reversed from that illustrated.

Figure 1:
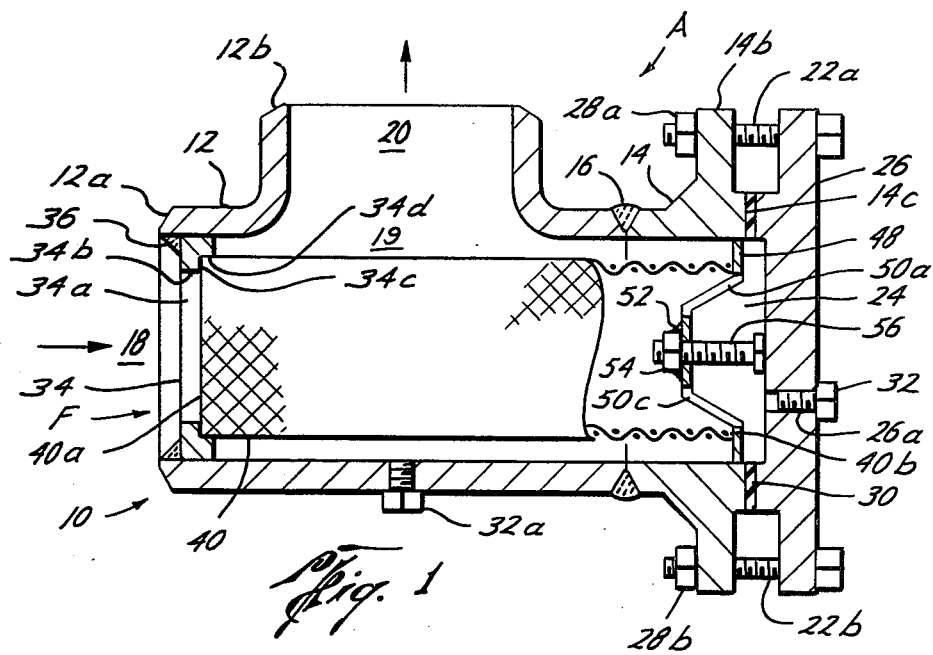
FIG. 1 is a side view, in section, of the filter apparatus of the present invention.

As illustrated in FIG. 1, the fluid filter apparatus A includes a flow housing, generally designated 10, for containing the fluid to be filtered in the flow line. The flow housing 10 is preferably formed of pipe fittings conforming to ASA dimensional specifications to enable flow line filter installations in both new and existing pipe runs with minimum modification or special design considerations. The flow housing 10 is formed of a standard weld pipe Tee 12 and weld neck pipe flange 14 secured together by annular weld bead 16 in the usual manner. The pipe Tee 12 forms an inlet flow opening 18 adjacent annular shoulder 12a into the housing flow passage 19 and an outlet flow opening 20 adjacent shoulder 12b. The shoulders 12a and 12b may be connected directly to flow lines (not illustrated) by welding in the usual manner or may be secured to flange fitting (also not illustrated) similar to flange 14. The dimensions and wall thickness of the flow housing 10 are of course controlled by the pipe size and pressure rating according to the ASA criteria.

The weld neck flange 14 is provided with the usual gasket sealing surface 14a and an annular flange 14b having circumferentially spaced bolt holes (not illustrated) for receiving therethrough securing threaded bolts 22a and 22b. Adjacent the circular gasket sealing surface 14a is the usual flow opening 24 which provides an access opening in the filter housing 10 for the filter screen apparatus, generally designated F, disposed in the housing flow passage 19.

The opening 24 is closed by a blind flange 26 while the filter is in operation to prevent escape of fluids from the flow passage 19 of the filter housing 10. Nuts 28a and 28b threadedly engage bolts 22a and 22b, respectively for securing the blind flange closure 26 with the housing 10 in the usual manner. A ring gasket 30 seals between the blind flange 26 and the weld neck flange 14 in the usual manner to block escape of fluid from the flow housing 10. The blind flange closure 26 is provided with a drilled and tapped opening at 26a which threadedly receives for securing and sealing therewith a drain or wash plug 32. Removal of the plug 32 enables the filter apparatus F to be flushed of sediment periodically without the necessity to remove the flange bolts. If the direction of the flow is reversed, the drain plug should be located at 32a.

Secured within the Tee 12 adjacent the inlet opening 18 is a filter stop and sealing ring 34. The stop ring 34 may be secured with the Tee 12 in any desired manner but preferably an annular weld bead 36 is employed for both securing and sealing the stop ring 34 with the Tee 12. The stop ring 34 is provided with a central opening 34a defined by the inner surface 34b which is stepped to provide an annular shoulder 34c. Adjacent the annular shoulder 34c is a filter positioning shoulder 34d that is concentric to surface 34b and slightly larger diameter. The filter apparatus F is held in sealing engagement with the annular shoulder 34c in a manner to be described, while the circular shoulder 34d maintains the filter apparatus F aligned with the central opening 34a of the stop ring 34 and spaced from the Tee 12.

Figure 4:
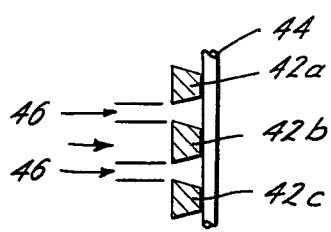
FIG. 4 is a section view of a segment of a preferred form of filter screen.

The filter screen apparatus A includes a tubular screen element or body 40 that is held in concentrically spaced relationship in the flow passage 19 of the flow housing 10. While a screen element formed of a mesh screen is illustrated, it is to be understood that the preferred screen element is formed in the manner illustrated and disclosed in the patents previously mentioned with the screen opening comprising the space between the helical wire wrap wedge screen member. A cross section of a segment of such a helical wrap wedge wire screen is illustrated in FIG. 4. Spirally wound wedge wire 42 is wrapped about longitudinally extending support ribs 44 with the wedge wire 42 illustrated in section as 42a, 42b and 42c. The wedge wire is welded at its smaller end to each of the support ribs 44 for forming a unitary tubular unit that may be cut to desired lengths. The helical space 46 between the enlarged ends of the wedge wire 42 form the flow openings which are self cleaning due to the taper of the wedge wire when the flow is in the direction indicated by the flow arrow. The details of construction and manner of fabricating these tubular wedge wire screens is of course set forth in the patents mentioned previously herein.

The tubular screen 40 includes a first or open end 40a engaging the shoulder 34c of the stop ring 34 and second open end 40b located adjacent blind flange 26. Concentrically secured about the end 40b is an outwardly extending collar or ring 48 having an outer diameter substantially equal to the diameter of the opening 24 of the well neck flange 14. The collar 48, along with stop ring 34, holds the tubular filter apparatus 40 in concentric relationship with the walls of the flow housing 10 and also serves to effectively seal the second end 40b of the tubular filter 40 with the housing 10 to prevent by-passing of the fluids to be filtered. By sealing the tubular filter 40 with the housing 10 at both the stop ring 34 and with the collar 48 the flow is directed radially outwardly through the filter screen 40 where it then flows from the flow housing through the outlet opening 20.

Figure 2:
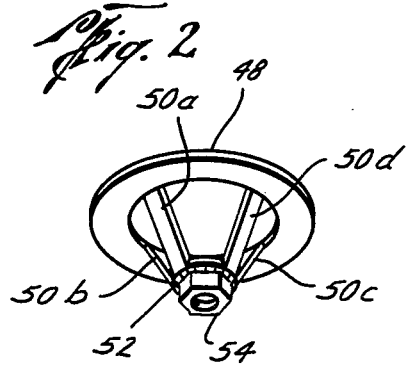
FIG. 2 is an isometric view of a portion of the length adjusting means of the tubular filter unit of the present invention.

As best illustrated in FIG. 2, the collar 48 is provided with a plurality of inwardly projecting fingers 50a, 50b, 50c and 50d that extend to a mounting base 52 located within the filter screen 40. Secured on the base 52, preferably by tack welding, is a nut 54 which threadedly receives a bolt 56. The bolt 56 and nut 54 provide adjustable engaging means with the blind flange 26 for holding the end 40a of the filter 40 in engagement with the stop ring 34. In the previously mentioned prior art filters manufactured by the assignee of the present invention, the length of the filter 40 was custom fitted to extend precisely between the stop ring 34 and the blind flange 26 and the filter screen 40 was therefore not interchangeable between filter housing 10. With the self-adjusting means provided by the present invention, the filters 40 may be kept in inventory and used interchangeably among the various filter housings 10 as the bolt 56 may be rotated in the nut 54 to compensate for the minor variations in dimensions. These minor variations in dimensions are exaggerated in both FIGS. 1 and 3 to emphasize the relationship.

The second embodiment illustrated in FIG. 2 is, as previously mentioned, for a straight through flow pattern. The flow housing 60 is formed of weld Tee 62 and a weld neck flange 64 assembled in a manner similar to that in FIG. 1 for forming flow passage 65. A flow inlet opening 66 and flow outlet opening 68 are provided in a spaced relationship according to the standard ASA dimensions as well as the filter access opening 70 of the Tee 64. The access opening is closed by blind flange 72 in a manner similar to that of the blind flange 26 of FIG. 1.

Diagonally positioned in the flow passage 65 is a stop and seal ring 74 having a central opening passageway 74a formed by the inner surface 74b adjacent the upwardly facing angular stop shoulder 74c which is in turn disposed adjacent the filter holding shoulder 74d. Such shoulders, while angled, are similar to the corresponding stop shoulders of the stop ring 34. The stop ring 74 is also secured with the housing 60 by an annular weld 76.

The tubular filter screen 77 is, of course, cut on a diagonal at its first end 77a for engaging the shoulder 74c and being held in concentric alignment by the shoulder 74d. Again, a mesh filter screen is illustrated in FIG. 3, but it is understood that the helically wrapped wedge screen, (a portion of which is illustrated in FIG. 4) is the preferred filter screen.

Outwardly projecting collar 80 is received within the access opening 70 for maintaining the concentric relationship between the tubular filter screen 78 and the housing 60. Downwardly projecting ribs 82 terminate in a base 84 mounting the nut 86 in a manner similar to that illustrated in FIG. 1. Threaded bolt 88 is received in the nut 86 for providing the adjustable means for engaging the blind flange 72 to ensure that the filter screen 78 is held in positive sealing engagement with the stop ring 74.

To remove undesired sedimentation or other solid materials from the flow fluid a drain plug 90 may be utilized.

OPERATION

The use and operation of both filter apparatus A of the present invention is substantially the same.

In the embodiment of FIG. 1, the inlet openings 18 and 20 are placed in fluid communication with the flow lines and the shoulders 12a and 12b are welded to the suitable connections. Such connections, as previously noted, may be to flanges which are in turn secured in the flow lines by flange bolting in the usual manner. Of course, other means for connecting in the flow line may be employed without departing from the scope of the present invention. The flow is then directed through the filter apparatus A in the direction indicated by the arrows of FIG. 1. Such flow passes into the central opening of the filter 40 adjacent the shoulder 40a and then flows radially outwardly through the filter screen 40 where it is then free to flow through the outlet opening 20.

When an undesired accumulation of sedimentation collects within the filter screen 40 the pressure drop across the screen 40 may be sufficient to reduce flow capacity, the plug 32 may be removed to enable flushing of the sedimentation from the flow passage 19 and the central opening of the filter screen 40 without disturbing the filter 40 or flange 26.

When it becomes desirable to change the filter screen 40 for any reason, all that is necessary is that the flange bolts 28a and 28b be removed from bolts 22a and 22b to enable removal of the blind flange 26. The filter 40 may then be removed through the access opening 24. A new filter 40 may then be inserted into the flow passage 19 of the housing 10 and the bolt 56 adjusted to ensure a tight fitting. The blind flange 26 is then replaced and the nuts 28a and 28b secured to the bolts 22a and 22b, respectively. Such replacement may be repeated as desired without the need to custom fit the length of the filter screen 40.

The operation of the embodiment in FIG. 3 is substantially the same with the Tee 62 being installed in the flow line in the usual manner. When the flow proceeds in the direction indicated by the arrows of FIG. 3 the flow will pass through the central passageway 74a of the stop ring 74 upwardly to a location above stop ring 74 where it flows radially outwardly through the filter screen and on out through the outlet opening 68. The filter screen 78 may be changed in the manner set forth with respect to the embodiment of FIG. 1.

The foregoing disclosure and description of the present invention are illustrative and explanatory thereof, and various changes in the size, shape and materials as well as in the details of the illustrated construction may be made without departing from the spirit of the invention.

The patents set forth hereinabove are hereby totally incorporated by reference in this disclosure for any and all purposes.

I claim:

1. A fluid filter apparatus, including:
 a T connection having a housing body including a hollow projection and a pair of aligned hollow projections extending laterally therefrom for forming flow passages and to form a filter receiving section of uniform size throughout its longitudinal extent;
 an inwardly extending annular flange stop ring formed on one of said aligned hollow projections and projecting radially inwardly of said aligned hollow projections to define one end of the filter receiving section;
 an external annular flange formed on the other of said aligned projections;
 closure flange means removably mounted with said external annular flange for closing said projection when filtering solids from the fluid passing through said housing;
 a hollow annular filter member positioned in the filter receiving section formed by said lateral projections, said annular filter member including:
  a core formed of coils spaced a predetermined amount, forming a first core end and a second core end;
  a plurality of circumferentially spaced ribs extending longitudinally of said core;
  said ribs having a surface secured to said core;
  said first end of said core sealingly engageable with said stop ring for seating on said inward extending annular flange and to retain said core in uniform spaced relation inwardly relative to said pair of aligned hollow projections;
  an outwardly extending annular flange formed adjacent said second end of said core for holding said core in uniform spaced relation relative to said pair of aligned hollow projections by engaging said body about the periphery of said flange; and
 means disposed adjacent said second end of said core and within said housing for adjustably engaging said closure flange for holding said filter member in sealing engagement with said stop ring.

2. A fluid filter apparatus for straight through flow, including:
 a T connection having a housing body including a hollow projection and a pair of aligned hollow projections extending laterally therefrom for forming flow passages;
 an inwardly extending annular flange stop ring diagonally formed in said housing between said pair of aligned hollow projections and concentrially aligned with said unaligned hollow projection to define one end of a filter receiving section uniform size throughout its longitudinal extent;

an external annular flange formed on said unaligned projections;

closure flange means removably mounted with said external annular flange for closing said unalighed projection when filtering solids from the fluid passing through said housing;

a hollow annular filter member positioned in the filter receiving section formed by said stop ring and said unaligned projection, said annular filter member including:

a core formed of coils spaced a predetermined amount, forming a first core end and a second core end;

a plurality of circumferentially spaced ribs extending longitudinally of said core;

said ribs having a surface secured to said core;

said first end of said core formed on a diagonal for sealing engagement with said diagonal stop ring for seating on said inward extending annular flange and to retain said core in uniform spaced relation inwardly relative to said unaligned hollow projections;

an outwardly extending annular flange formed adjacent said second end of said core for holding said core in uniform spaced relation relative to said unaligned projection by engaging said body about the periphery of said flange; and means disposed adjacent said second end of said core and within said housing for adjustably engaging said closure flange for holding said filter member in sealing engagement with said diagonal stop ring.

* * * * *